United States Patent
Bilansky et al.

[11] Patent Number: 5,878,225
[45] Date of Patent: Mar. 2, 1999

[54] DUAL COMMUNICATION SERVICES INTERFACE FOR DISTRIBUTED TRANSACTION PROCESSING

[75] Inventors: Mark Alan Bilansky, Apalachin; Kevin Chuang-Chi Huang, Endicott; James William Ryder, Binghamton; Edward James Stavana, Endicott, all of N.Y.

[73] Assignee: International Business Machines Corporation, Armonk, N.Y.

[21] Appl. No.: 650,121

[22] Filed: Jun. 3, 1996

[51] Int. Cl.[6] .............................. G06F 13/00; G06F 13/42
[52] U.S. Cl. .................. 395/200.57; 370/469; 395/200.6
[58] Field of Search ...................... 395/200.57, 200.58, 395/200.6, 200.79; 370/465, 469

[56] References Cited

U.S. PATENT DOCUMENTS

| | | | |
|---|---|---|---|
| 4,768,150 | 8/1988 | Chang et al. | 364/300 |
| 4,797,879 | 1/1989 | Habbab et al. | 370/3 |
| 4,926,414 | 5/1990 | Baratz et al. | 370/31 |
| 5,072,441 | 12/1991 | Szware | 370/60 |
| 5,091,849 | 2/1992 | Davis et al. | 395/100 |
| 5,187,787 | 2/1993 | Skeen et al. | 395/600 |
| 5,245,703 | 9/1993 | Hubert | 395/200 |
| 5,278,834 | 1/1994 | Mazzola | 370/94.1 |
| 5,287,453 | 2/1994 | Roberts | 395/200 |
| 5,303,344 | 4/1994 | Yokoyama et al. | 395/200.6 |
| 5,313,521 | 5/1994 | Torii et al. | 380/21 |
| 5,317,568 | 5/1994 | Bixby et al. | 370/85.6 |
| 5,369,705 | 11/1994 | Bird et al. | 380/21 |
| 5,442,749 | 8/1995 | Northcutt et al. | 395/200.09 |
| 5,457,797 | 10/1995 | Butterworth et al. | 395/650 |
| 5,459,600 | 10/1995 | Davis et al. | 359/173 |
| 5,483,647 | 1/1996 | Yu et al. | 395/500 |
| 5,485,455 | 1/1996 | Dobbins et al. | 370/60 |
| 5,485,460 | 1/1996 | Schrier et al. | 370/94.1 |
| 5,491,800 | 2/1996 | Goldsmith et al. | 395/200.12 |
| 5,509,010 | 4/1996 | La Porta et al. | 370/68.1 |
| 5,608,446 | 3/1997 | Carr et al. | 348/6 |

Primary Examiner—Frank J. Asta
Assistant Examiner—Matthew Kaminer
Attorney, Agent, or Firm—Shelley M. Beckstrand

[57] ABSTRACT

A system and method is provided for communicating data and control information between two systems, each system including a communication protocol stack, such as an advanced program to program communication (APPC) protocol stack which includes an I/O interface layer with modules for OPEN, GET, PUT, UPDATE, RELEASE, DELETE, CLOSE, and an OPC interface to a serial optical bus. Dual control and data paths are established from, for example, a client system to a single agent on a target system, the control path including a protocol stack and a data path avoiding at least one layer of the protocol stack. Packets of control information for a given process are transferred on the control path, and packets of data information are transferred on the data path. Communications are sychronized so that the client and target systems send and receive communications packets on the same one of the two paths.

14 Claims, 10 Drawing Sheets

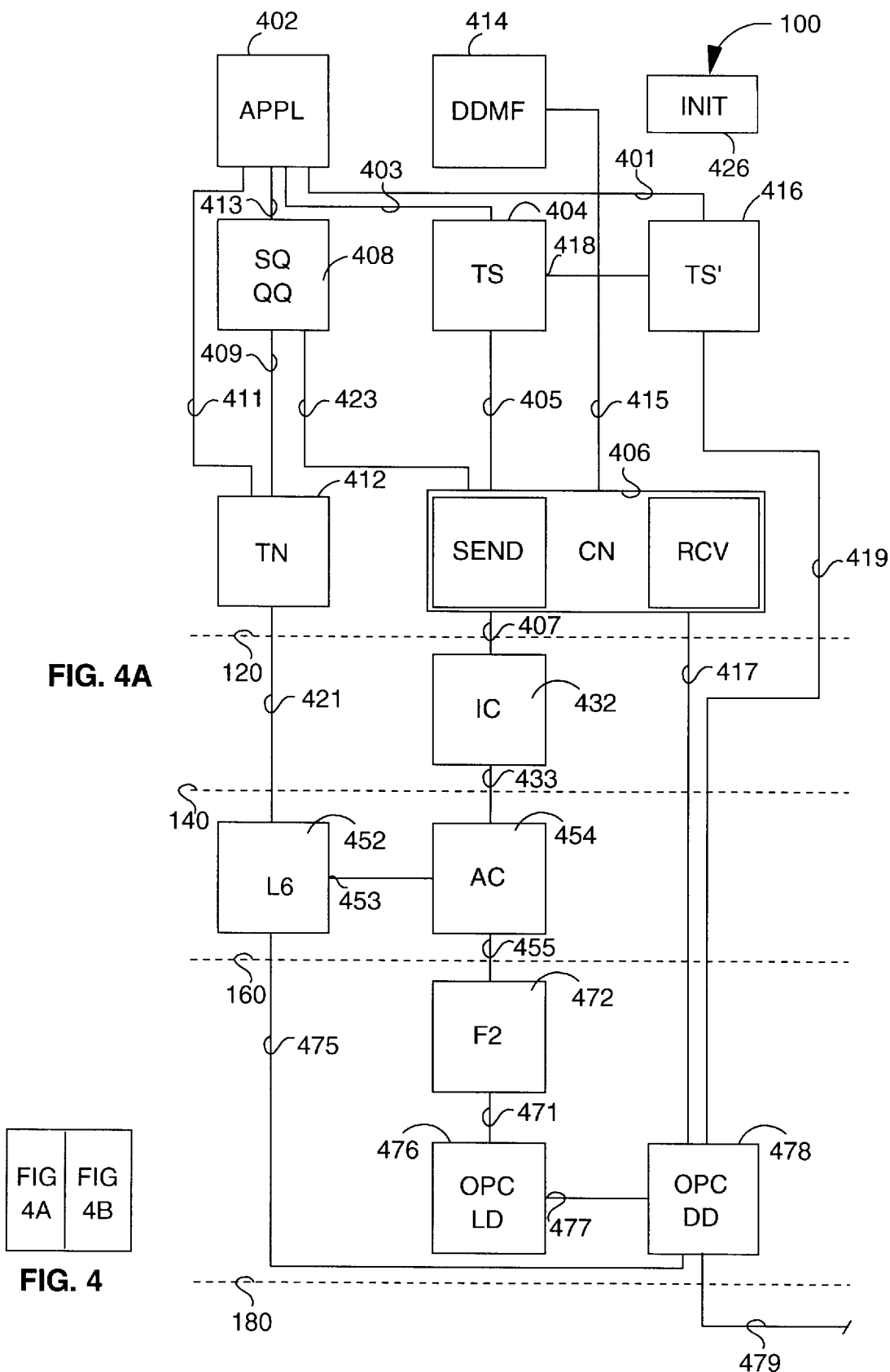

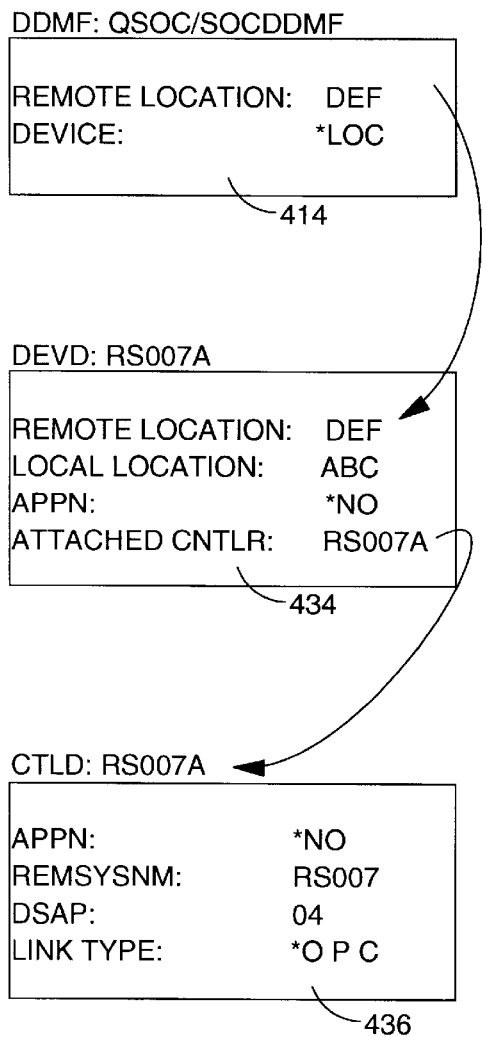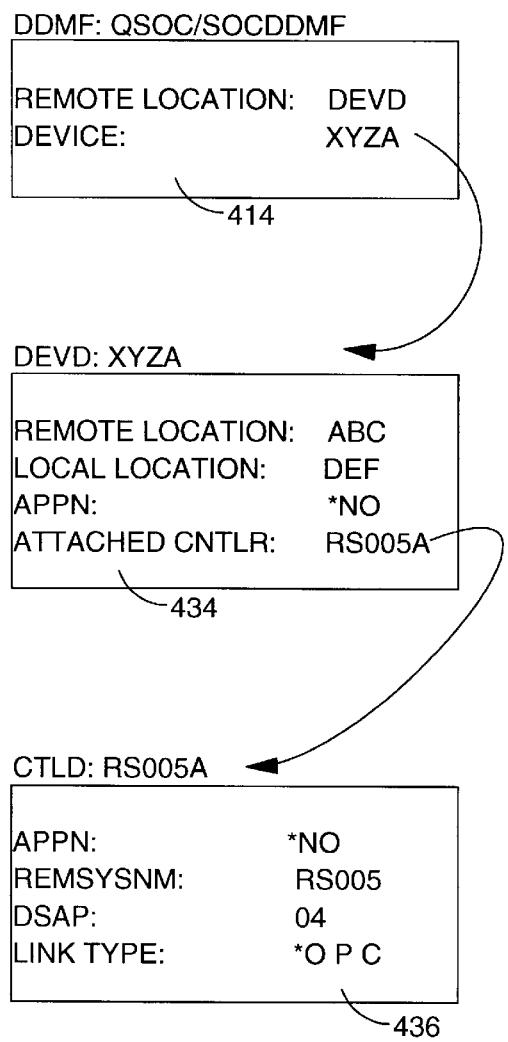
FIG. 6A — METHOD #1
FIG. 6B — METHOD #2

DUAL COMMUNICATION SERVICES INTERFACE FOR DISTRIBUTED TRANSACTION PROCESSING

BACKGROUND OF THE INVENTION

1. Technical Field of the Invention

This invention pertains to communications systems. In particular, this invention provides for communications selectively through a path including several protocol layers when sending control information and through a path avoiding one or more such layers when sending data.

2. Background Art

The Advanced Program-to-Program Communication (APPC), used by transaction programs on, for example, the IBM system AS/400 to establish a conversation and send and receive data from a partner application, imposes many architectural layers, based upon the Open System Interconnection (OSI) reference model, comprising seven layers: application, presentation, session, transport, network data link and physical. This OSI reference model, and the IBM AS/400 OSI Communications Subsystem/400 implementation thereof, is described in IBM Application System/400 Technology Journal, Version 2, First Edition (January 1992), IBM Publication S325-6020-00, the teachings of which are incorporated herein by reference.

The design of APPC is strictly layered in the sense that upper layers do not access lower layers. With the high overhead of a network communication path length including such layers, latency of user-to-user communication is not getting better at the same rate as the advances in communication link speed.

The Distributed Data Management (DDM) support on AS/400 allows application programs to access data files that reside on a remote system. Systems that use DDM communicate with each other using advanced program-to-program communication (APPC) support. Using DDM, an application program can get, add, change, and delete data records in a file that exists on a target system. A distributed transaction using the DDM function can also specify the Protected Conversation feature to ensure the integrity of the transaction data. In such a protected conversation, two-phase commit control is used to commit changes to database files or back out those changes for a transaction; that is, if a system failure occurs in the middle of transaction, all the database changes made up to that point are rolled back.

Broadly defined, there are two major types of network communication functions used for distributed transactions: one provides the capability for an attached transaction program to communicate with the other transaction program in an SNA network for sending and receiving data. The other is a DRDA two-phase commit protocol that provides the capability to keep protected resources (such as data bases) in synchronization across a distributed transaction, by committing changes to those resources or backing out the changes.

When an application program on a source system first attempts to access a remote file, it establishes a communication path to a target system with Remote Location Name in the DDM file. In response, an agent job starts on the target system and a DDM conversation is established when the remote system receives the program start request. After the target DDM job is started, the application on the source side initiates a program request to access the remote file.

The APPC protocol keeps the logical network of logical units (LUs) and sessions independent of the physical communication configuration, therefore the PUT and GET operations in the APPC protocol stack are uniform across a wide range of data link controls.

It is an object of the invention to enhance the communication performance for distributed transactions by bypassing a very significant portion of network communication overhead on both source and target systems.

It is a further object of the invention to accomplish this enhanced performance while preserving all APPC architectural requirements and Intersystem Communication Function (ICF)/CPI-C interfaces.

It is a further object of the invention to provide a communications system which will allow generic APPC conversations to be transparently transported across an Opti-Connect (OPC) bus between networking multiplexors, or path control layer, (F2) components on each side.

It is a further object of the invention to provide an improved system and method for synchronizing the operation of two communication paths.

It is a further object of the invention to provide two sychronized communication paths, one fast, the other slow, through the same physical link.

SUMMARY OF THE INVENTION

In accordance with this invention, a client/server communications system is provided in which each system includes a strictly layered protocol stack for establishing communications and transferring data with respect to the other for a given process. In accordance with one aspect of the invention, a protected conversation method is provided comprising the steps of (1) establishing dual control and data paths from the client system to a single agent on the server system, the control path including a protocol stack and a data path avoiding at least one layer of said protocol stack; (2) transferring packets of control information for a given process on said control path; (3) transferring packets of data information on said data path; and (4) synchronizing communications so that said client and server systems send and receive communications packets on the same one of the two paths.

In accordance with another aspect of the invention, synchronization of communications is achieved by twisting, or blending, two paths by use of a check other path flag and a first crossing after commit flag for switching control between a communication path and a bus path.

Other features and advantages of this invention will become apparent from the following detailed description of the presently preferred embodiment of the invention, taken in conjunction with the accompanying drawings.

BRIEF DESCRIPTION OF THE DRAWINGS

FIGS. 4A and 4B, oriented as shown in FIG. 4, are a diagrammatic illustration of the connection and control system of the invention.

FIGS. 6A and 6B are flowchart representations of two methods for setting DDMF fields for OPC.

FIG. 9 illustrates the communications path through the connection and control system of FIGS. 4A and 4B, and FIG. 10 illustrates the data path there through.

BEST MODE FOR CARRYING OUT THE INVENTION

List of Abbreviations

Figure 1:
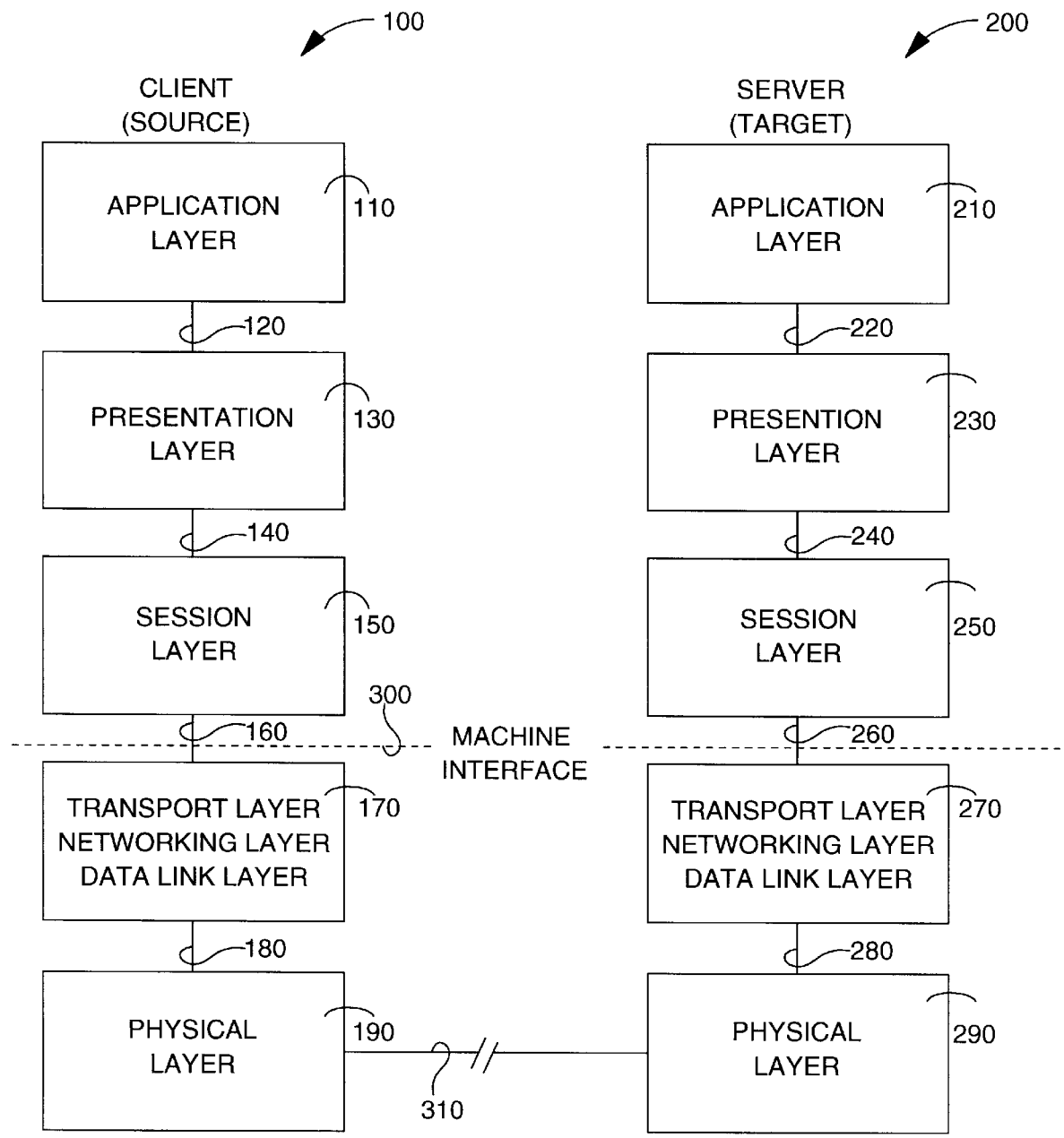
FIG. 1 is a diagramatic illustration of the protocol layers of the AS/400 operating system implementation of the OSI reference model.

APPC Advanced Program-to-Program Communications
APPN Advanced Peer to Peer Networking
CDD Coupling Device Driver
CN Communications I/O ICF Interface
CPI-C Common Programmers Interface-Communications
C-PRM Communication Protected Resource Manager
DDM Distributed Data Management
DRDA Distributed Relational Database Architecture
F2 Fast T2 (networking multiplexors, or path control layer)
FM Functional Manager
ICF Intersystem Communication Function
IPCF Interprocessor Communication Facility
LU Logical Unit
LUW Logical Unit of Work
MI Machine Interface
OCLC OPC Link Controller (aka OPC Line Driver)
ODP Open Data Path
OPC OptiConnect (An IBM AS/400 product)
PDU Protocol Data Unit
PIU Path Information Unit
QSOC The OPC Subsystem on AS/400
SID Segment Identifier
SNA System Network Architecture
SQL Structured Query Language
T2 Transport/Networking Component Layer of AS/400 APPC Protocol Stack
TMN OPC (OPC) Target Main Routine
XPF Extended Program Facility
XPF L6 XPF LU 6.2 Sync Point Architecture
XPF TN XPF Transaction Manager In two phase commit, to go from one system to another using distributed transactions, two major functions are required: (1) sending data between the system nodes and (2) sending control information between the system nodes. To do this typically requires that processing proceed through a path including several architected protocol layers. This invention uses a higher speed bus for both functions, and avoids layers of the path when performing certain preselected functions, including sending and receiving data, as distinguished from, for example, two phase commit control. It also provides an interface for two paths to the same high speed bus. One interface handles control (through a path that includes the complete APPC protocol stack) and the other handles data directly from the user I/O commands (gets and puts). This latter path is referred to as fast path, and has two slightly different flows, both of which avoid the longer communications path. The first fast path flows from application 402 to the TS' DDM functions 416 and then to the OPC device driver 478. All DDM I/O commands take this route. SQL I/O commands flow from the application 402 to the SQ/QQ components 408 to the Communications I/O ICF Interface 406 to the OPC Device Driver 478 on the source system.

Further, this invention provides a system and method for communicating data and control between a plurality of systems, whereby customers are permitted to use distributed transactions with opticonnect capability. Each system includes a communication protocol stack, such as an advanced program to program communication (APPC) protocol stack which includes an I/O interface layer with modules for OPEN, GET, PUT, UPDATE, RELEASE, DELETE, CLOSE, and an OptiConnect (OPC) interface to a serial optical bus. An OptiConnect line driver interfaces the communications protocol stack to the OPC device driver; a communications I/O interface module for OPEN establishes a dual path (control and data) and an agent on the remote system. Responsive to a request from an application program in a client system to establish a protected conversation with a server system, if a satisfactory communication path already exists for this process between the client and the server systems, it is used; if not, a dual APPC communications (control) and OptiConnect bus (data) path to a single agent on the server system is established. Packets of control information for this process are transferred on the APPC communications path, and packets of data information for this process are transferred on the OptiConnect (OPC) bus path. The communications on these paths are synchronized so that the systems don't hang; that is, so that the client and server systems send and receive communications packets on just one of the two paths.

As will be more fully described hereafter, this synchronization is achieved in the following manner. A communication path is established from the source to the target, and a bus path is attached to it. (The communication path and bus path are logical links which, in the preferred embodiment, use the same physical link and appears as one to the application program. The bus path is a much higher speed logical path through fewer protocol levels than the slower speed communication path over which control messages are sent.) The target, or agent, then defaults to, or goes to sleep on (that is, waits while monitoring), the bus path until it receives either data or a check-other-path signal. Responsive to data, the target responds to the associated command with data on the bus path. Responsive to check-other-path on the bus path from the source, the target goes to sleep on the communication path; and upon receipt of a control request on the communication path, executes a control command, the completion of which is indicated by a first-crossing flag being set on the communication path on the source. In the preferred embodiment of the invention, the first-crossing flag indicating completion of a unit of work is set on the first transmission with respect to a subsequent unit of work (hence the name, first crossing.) Responsive to the first-crossing flag, the target switches control back to the bus path, on which will appear the second and subsequent packets of data with respect to the subsequent unit of work.

Referring to FIG. 1, the protocol layers of, for example, and IBM AS/400 system include, at a client node, application layer 110, presentation layer 130, session 150, transport, networking and data link layers 170, and physical layer 190. The interfaces between these tightly architected layers are represented as interfaces 120, 140, 160 and 180, respectively.

Similarly, at server, or target, node 200, protocol layers 210, 230, 250, 270 and 290 communicate across interfaces 220, 240, 260, and 380, respectively. Client system 100 and server system 200 communicate at the physical layer over communication link 310.

Figure 2:
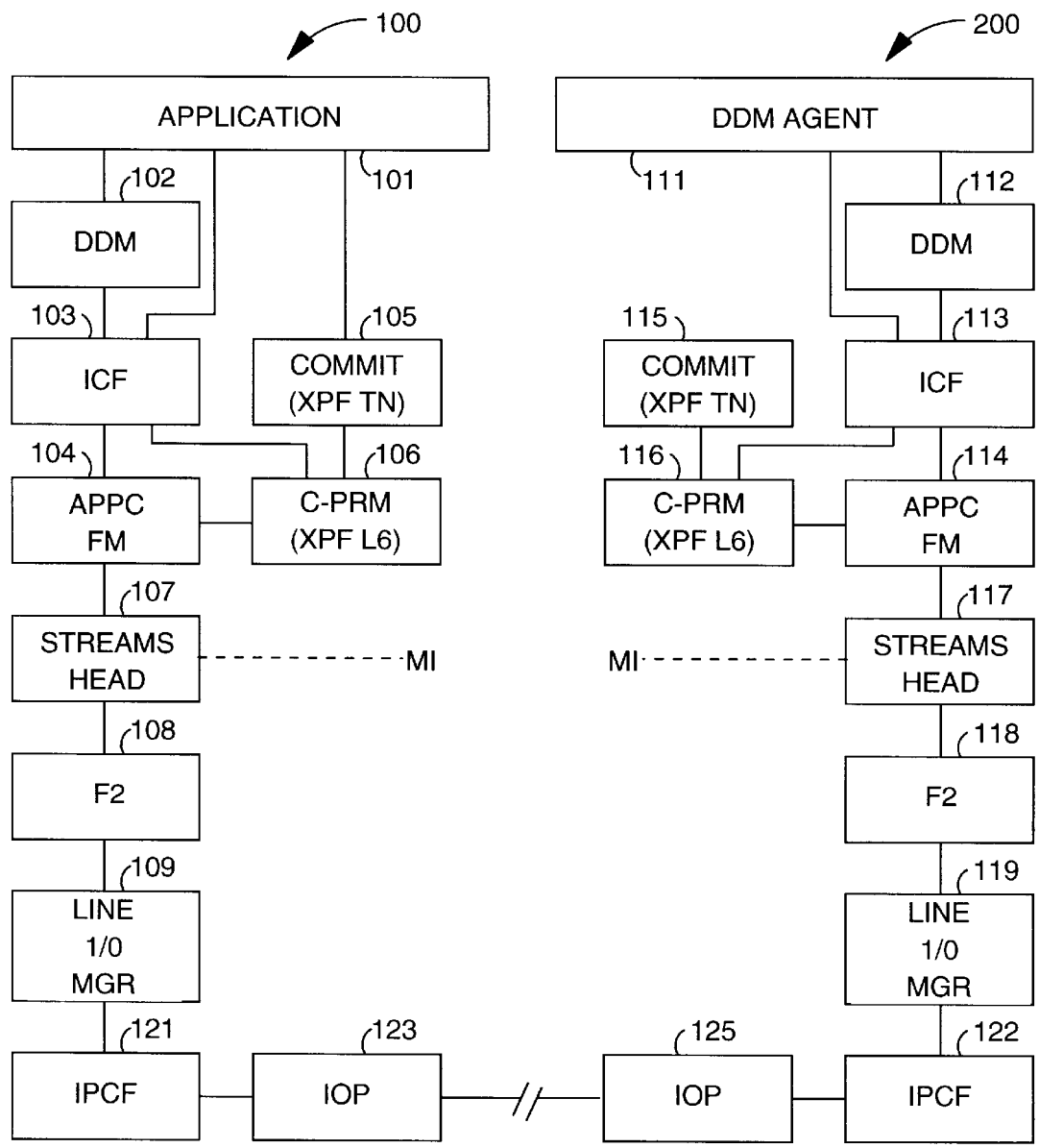
FIG. 2 is a diagrammatic illustration of a communications control stack, for illustrating the prior art PUT and GET operations of distributed data management using an APPC protocol stack.

Referring now to FIG. 2, which is an illustration of the "long path", distributed data management (DDM) 102 support on, for example, an IBM AS/400 system allows an application program 101 to access a data file at agent 111 that resides on remote system 200. Systems that use DDM communicate with each other using advanced program-to-program communication (APPC) 104 support. Using DDM 102, an application program 101 can get, add, change, and delete data records in a file that exists on target system 200. A distributed transaction using the DDM function can also specify a protected conversation feature to ensure the integrity of the transaction data. A protected conversation is an LU 6.2 conversation that is allocated using a sync point option and uses two-phase commit and resync protocols to commit changes to database files or back out those changes for a transaction; that is, if a system failure occurs in the middle of a transaction, all the database changes made up to that point are rolled back.

Broadly defined, there are two major types of network communication functions used for a distributed transaction. First, the capability for an attached transaction program to communicate with the other transaction program in a System Network Architecture (SNA) network for sending and receiving data is provided. (An SNA network is part of a user-application network that conforms to the formats and protocols of System Network Architecture; it enables reliable transfer of data among end users and provides protocols for controlling the resources of various network configurations. The SNA network includes network accessible units, boundary function, gateway function, and intermediate session routing function components, and a transport network.) Second, a two-phase commit protocol to keep protected resources (such as data bases) in synchronization across the distributed transaction, by committing changes to those resources or backing out those changes, is provided.

When application program 101 on source system 100 first attempts to access a remote file, it establishes a communication path to target system 200 with Remote Location Name in DDM file 102. An agent job 111 is started on target system 200 and a DDM conversation is established when remote system 200 receives a program start request. After the target DDM 112 job is started, application 101 on the source side can initiate a program request to access the remote file at agent 200.

The APPC protocol keeps the logical network of logical units (LUs) and sessions independent of the physical communication configuration, therefore the PUT and GET operations in the APPC protocol stack are uniform across a wide range of data link controls.

Referring further to FIG. 2, the PUT and GET operations of DDM using APPC will be described.

The general flow of a PUT operation using OPC Data Link Control on source side 100 is as follows. Application program 101 issues a write operation. DDM 102 issues Intersystem Communication Function (ICF) 103 PUT for the put operation. Responsive thereto, ICF 103 issues a put command to APPC functional manager (FM) 104. APPC FM 104 eventually issues a stream instruction to cause the data to be sent. Stream head 107 issues a put next instruction to cause the data to flow to fast T2 (F2) 108, the path control layer. Path control layer, F2 108 issues a PUT operation to request the data link control layer, line I/O manager 109, to send the data through interprocess communication facility 121, 122 and IOP 123, 125. Upon receipt of the PUT request, line I/O manager 109 issues a SEND-REQUEST. This send command is data link dependent.

Figure 3:
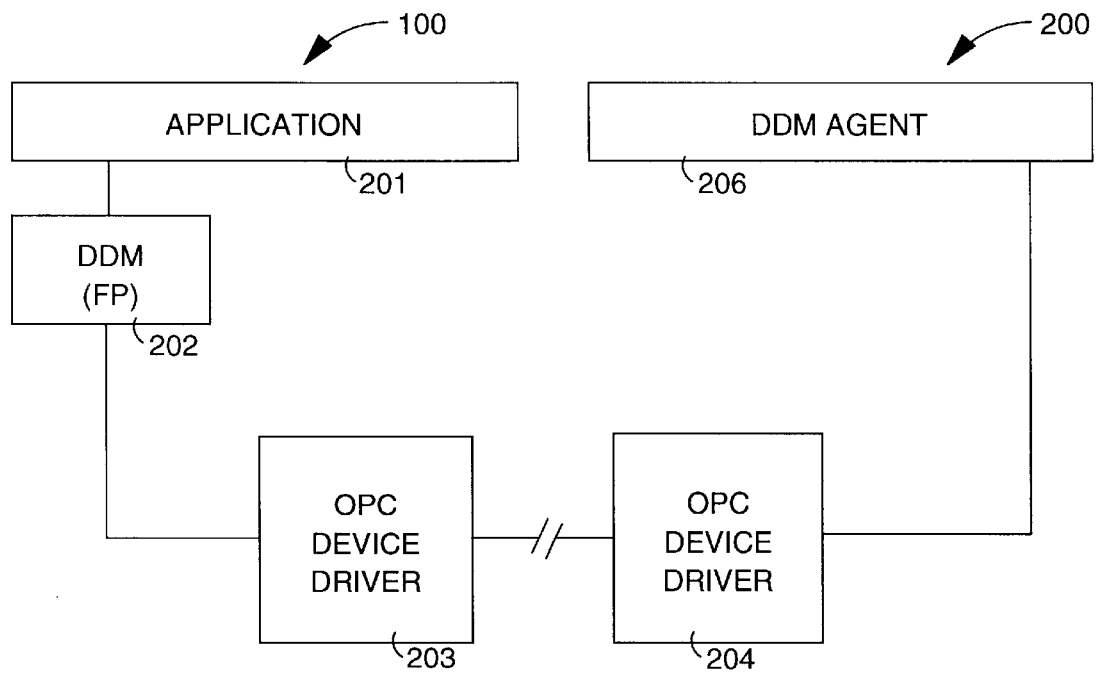
FIG. 3 is a diagrammatic illustration of the fast path architecture, for illustrating PUT and GET operations in accordance with the fast path connection and control system of the invention.
Figure 11:
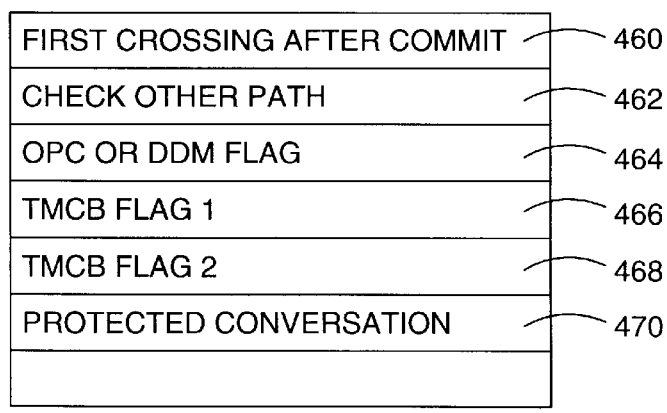
FIG. 11 illustrates various flags and bits used in the preferred embodiment of the invention.

Referring to FIG. 3, in accordance with this invention, for PUT and GET operations an alternate path, referred to as the fast path, is provided to accomplish the same operations as a straight line flow down the APPC stack in a manner transparent to the application. This alternative path is essential to satisfactory operation of a high bandwidth data link, and at the same time fulfills the APPC architectural requirements as set forth in Application System/400 Communications: Advanced Program-toProgram Communications Programmer's Guide, Version 2, Application Development, Second Edition (September 1992), IBM Publication SC41-8189-01, the teachings of which are incorporated herein by reference.

Referring to FIG. 3, when application 201 opens a DDM file for remote data access, DDM routine 202 checks to see if a fast path feature is installed. If the feature is installed, the DDM 202 routines that intercept all I/O operations route all GET, PUT, and UPDATE operations through the fast path illustrated in FIG. 3, and route the two-phase commit commands through the normal APPC communication path previously described in connection with FIG. 2. When a Fast-Path feature is detected by DDM 202, it indicates such on an Open File instruction issued to allow access to a given file. Subsequently when a PUT operation is requested for the remote file, the Fast-Path DDM routines 202 are called to do all data transfer operations through OPC path 203, 204. The PUT and GET operations using the Fast-Path feature accomplish the same functions as PUT and GET operations through the APPC stack of FIG. 2.

Referring further to FIG. 3, the general flow of a PUT operation on source 100 side is as follows. Application program 201 issues a write operation. DDM 202 issues a Send-Request directly to OPC device driver 203, which sends the data to remote system 200.

Thus the DDM fast-path feature of FIG. 3 bypasses the communication service layers of intersystem communication function (ICF) 103, 113, advanced peer to peer communication function manager (APPC FM) 104 114, data flow control 107, 117, data control layer 108, 118 and line driver 109, 119 on both source and target sides for all GET, PUT and other I/O operations.

Referring again to FIG. 2, a transaction program 101 uses either the ICF 103 or CPI-C interfaces, including commit 105 and C-PRM 106, to the Advanced Peer to Peer Communication Function Manager (APPC FM) 104 to communicate with transaction programs at a remote system. These ICF and CPI-C interfaces 103, 105, 106 provide the function of registering or removing protected conversations. If transaction program 101 is using commitment control, transaction manager TN 105 and Communication Protected Resource Manager (C-PRM) (L6) 106 coordinate commit and rollback processing for registered resources. For both types of functions, actual communication interfaces to a remote system are normally initiated at APPC FM 104, the presentation layer, and not at a higher layer. At the Advanced Peer to Peer Communication Function Manager (APPC FM) layer 104, there is a set of functions, formats and protocols for conversations between programs on separate systems, and no data link dependent function is allowed. For this reason, the two-phase commit commands intercepted are allowed to flow through the normal APPC stack for communication services. However, the flow of two-phase commit commands is handled somewhat differently with the Fast-Path feature. When a two-phase commit command is issued on the source side, the DDM routine 102 will let it flow through the normal APPC path and inform the target side of the arrival of the command. The DDM routine 112 on the target side, which always waits to receive the fast-path commands, will be alerted to make a switch to receive those commands passed up from the normal APPC stack. When the data arrives, it is passed up directly to the application/agent 111 just like the normal APPC flow.

Figure 4B:
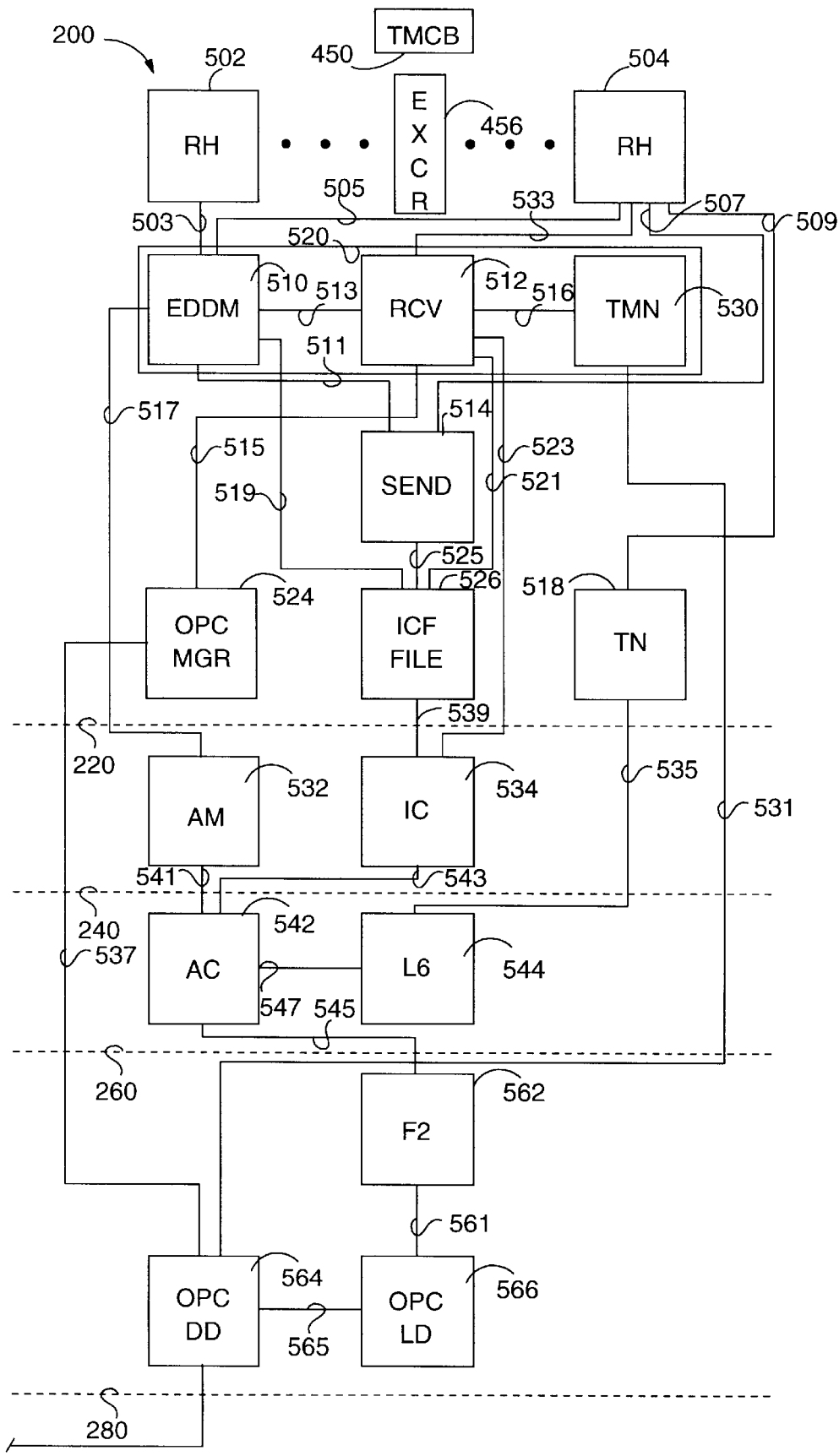

Referring to FIGS. 4A and 4B, the communications architecture of source system node 100 of the invention will be described.

Included within application layer 110, above interface 120, in source node or system 100, are application 402, SQL (SQ,QQ) 408, open system file management modules (TS) 404, replaced fast path file management modules (TS') 416, DDM File 414, 2 phase commit control manager (TN) 412, and communication I/O ICF interface (SEND/RCV) (CN) 406. Application 402 interfaces with two-phase commit control manager (TN) 416 as represented by line 411, with open system file management modules (TS) 404 as represented by line 403, with SQL SQ/QQ 408 as represented by line 413, and with replaced fast path file management modules (TS') 416 as represented by line 401. SQL SQ/QQ 408 interfaces with TN 412 as represented by line 409, with communications I/O ICF interface (CN) 406 as represented by line 423, and with application 402 as represented by line 413. TS 404 interfaces with application 402 (line 403), CN 406 (line 405), and TS' 416 (line 418). TS' 416 interfaces with TS 404 (line 418) application 402 (line 401) and OPC device driver 478 (line 419). DDMF 414 interfaces with CN 406 (line 415). TN 412 interfaces with SQ,QQ 408 (line 409), application 402 (line 411) and with L6 452 (line 421). CN 406 interfaces with TS 404 (line 405), DDMF 414 (line 415) IC 432 (line 407), SQL 408 (line 423), and OPC device driver 478 (line 417).

Presentation layer 130 includes ICF interface modules (IC) 432, which interfaces with CN 406 (line 407) and AC 454 (line 433).

Session layer 150 includes LU 6.2 architecture manager (L6) 452 and Advanced Program-to-Program Communications module (AC) 454. L6 452 interfaces with TN 412 (line 421) in application layer 110, with OPC DD 478 (line 475) and with AC 454 (line 453).

Transport, network and data link layers 170 include networking multiplexer (F2) 472, OPC line driver 476 and OPC device driver 478. F2 interfaces with AC 454 (line 455), and OPC line driver 476 (line 471). OPC line driver 476 interfaces with F2 472 (line 471) and with OPC device driver 478 (line 477). OPC device driver 478 interfaces with CN 406 (line 417), TS' 416 (line 419), OPC line driver 476 (line 477), and OPC link 479.

Physical layer 190 comprises, in this embodiment, OPC link 479, which is the optical bus between OPC device drivers 478 and 564.

Referring to FIGS. 4A and 4B, the communications architecture of target system node 200 will be described.

Application layer 210, above boundary 220, includes request handlers (RH) 502, 456, 504, agent 520 (which includes send 514 and all RH 502, 456, 504), new agent (TMN) 530, EDDM 510, 2 phase commit control manager (TN) 518, receive 512, send 514, OPC manager 524 and ICF file 526.

Presentation layer 230 includes attachment manager (AM) 532 and ICF interface modules (IC) 534). Session layer 250 includes APPC (AC) 542 and LU 6.2 architecture manager (L6) 544. Transport, networking and data link layer 270 includes networking multiplexer (F2) 562, OPC device driver 564, and OPC line driver 566. Physical layer 290 includes OPC data link line 479.

Request handler 502 interfaces with EDDM 510 as represented by line 503. Request handler (RH) 504 interfaces with EDDM 510 (line 505), RECEIVE 512 (line 533), SEND 514 (line 507) and TN 518 (line 509). EDDM 510 intefaces with AM 532 (line 517), ICF file 526 (line 519), RECEIVE 512 (line 513), SEND 514 (line 511), RH 502 (line 503) and RH 504 (line 505). RECEIVE 512 also interfaces with ICF file 526 (line 521), OPC manager 524 (line 515), new agent TMN 530 (line 516) and IC 534 (line 523). SEND 514 also interfaces with ICF file 526 (line 525).

New agent (TMN) 530 interfaces with RECEIVE 512 (line 516) and OPC device driver 564 (line 531). TN 518 also interfaces with L6 544 (line 535). OPC manager 524 also interfaces with OPC device driver 564 (line 537). ICF file 526 also interfaces with IC 534 (line 539).

AM 532 also interfaces with AC 542 (line 541). IC 534 also interfaces with AC 542 (line 543). AC 542 also interfaces with F2 562 (line 545) and L6 544 (line 547). F2 562 also interfaces with OPC line driver 566 (line 561). OPC line driver 566 also interfaces with OPD device driver 564 (line 565), which also interfaces with OPC link 479.

By way of overview to the system and method of the invention, to allow the Fast-Path feature and the normal APPC communication path to use the same OPC data link 479, two functions are provided:

1. APPC module AC 454 for OPC data link provides the APPC communication service which provides the ICF program interface 407.
2. OPC device driver 478 provides XPF interfaces 417 for CN 406 and fast path TS' 419 to send and receive data via OPC line 479.

APPC OPC module AC 454 with OPC line driver 476 inserted below F2 472 uses OPC device driver 478 to communicate with remote system 200. Interfaces are also provided by the OPC device driver DD 478 for data transfer operations by the OPC data link control function 476.

Referring further to FIG. 4A and 4B, showing client system node 100 and target system node 200, the operation of this preferred embodiment of the invention will be described, beginning with a description of the roles of the various control modules, to be followed by a description of the steps executed in an example flow through the logic for opening a protected conversation through to a first complete commit.

Application 402 on source node 100 is an application program which, to initiate execution of the method of this invention, requests an input/output operation.

Management modules TS 404 and TS' 416 function to coordinate the input/output operation. Application 402 does database accesses transparently, and TS/TS' coordinate access to remote nodes, such as target node 200, when such have the desired database.

a. Either the real TS 404 modules (DDM) will be in the entry point table, or the TS' 416 serial optical channel (OPC) modules will be an entry point table. This is determined at open time. When fast path I/O commands are issued by the application (such as gets and puts), control passes into here. Fast Path (FP) commands will be directly routed by device driver 478 to TMN module 530 at target system 200.

b. When the First Crossing after Commit flag 460 is ON (only needs to be detected by TS' (OPC) 416), TS' 416 transfers control to the regular TS 404 (equivalent) module to handle this I/O request. TS 404 will eventually call CN 406 and CN 406 will handle the routing.

c. TS' 416 assures that the commit portion, stream commit control, of the open file is NOT sent when protected conversation is active.

Figures 9, 10:
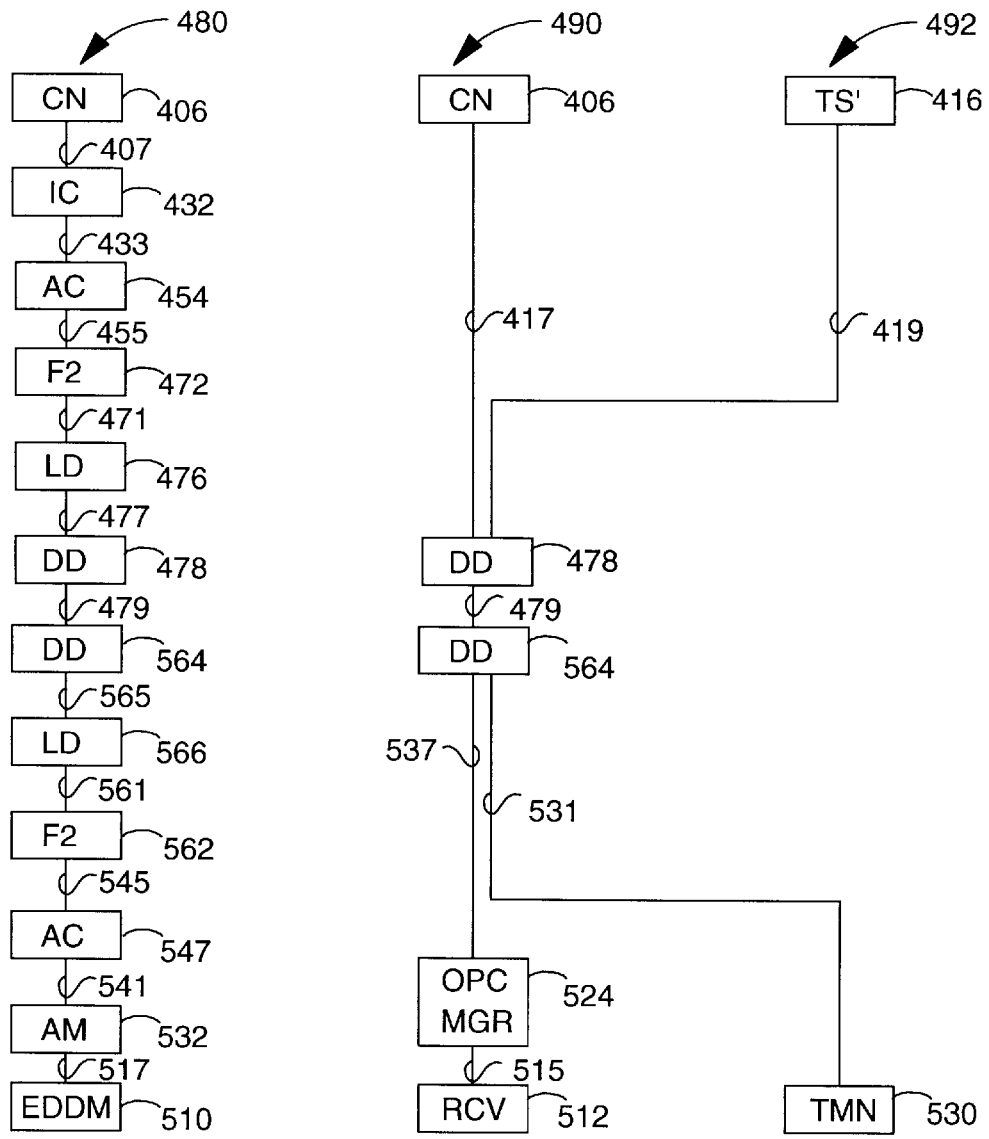

Communication I/O ICF interface (CN) 406 at Source system 100 coordinates distributed data management (DDM) and SQL communications. Whether the request is to access a SQL or application database, or a DDM data base, CN 406 issues an intersystem communication function (ICF) command to direct the data packet to the proper agent 520 on a remote system.

a. CN 406 sends a Check Other Path 462 command to target 200 when there is a send error or deallocate command prior to sending the actual error or allocate message.

b. If the First Crossing after Commit flag 460 is ON (set by source L6 452) then CN 406 ensures that the longer communications path is the one taken. To allow optimization to be performed by Commit, the first data after a commit flow must also go the longer communications path. L6 452 sends some information to target node 200, where target TN 518 is waiting to finish. CN 406 at source node 100 turns the First Crossing after Commit flag 460 OFF after it has sent the command over the communications path. Before returning to its caller, CN 406 sends a Check Other Path 462 command message to TMN 530. There are 2 bits in the command. The first bit is to signal that the other path should be checked. The second bit is used when this Check Other Path command 462 is sent by CN 406 after it has routed the first command after a commit flow over the communications path. Control is passed to TMN 530, which sets these two bit values in the Target Main Control Block (TMCB) 450 and returns to receive (RCV) in CN 406. CN RCV 406 checks the first bit and issues an ICF GET to get the data waiting on the communications path; this is the data that was sent as the first data after commit. It has been held in F2 472, and then AC 454, buffers. The second bit is used to indicate a one shot communications conversation receive.

c. All other entries into CN 406, when the OPC flag 464 in TMCB 450 is ON, will go over bus 479. When the conversations are being established, the communications evoke will go over the communications path and the bus evoke will go over the bus path. Referring to FIG. 9, the communications path evoke occurs first, to establish the slower speed communications path 480 from CN 406 along the path including lines 407, 433, 455, 471, 477, 479, 565, 561, 545, 541, and 517 to EDDM 510. Referring to FIG. 10, the bus path 490 is established from CN 406 along the path including lines 417, 479, 537 and 515 to receive block 512. In this embodiment, first communication path 480 is established for control messages, and bus path 490 is established for data messages.

Intersystem communications (IC) interface modules 432 at source 100 provide code that implements the intersystem communications function (ICF), a standard IBM interface for applications programs to use APPC. IC 432 transfers packets to APPC AC 454.

Advanced Program-to-Program Communication (APPC, or AC) 454 at source 100 issues an instruction which crosses the machine instruction (MI) boundary 160 to networking multiplexer (F2) 472.

LU 6.2 architecture manager (L6) 452 at Source 100 issues OPC Evoke, sets the First Crossing after Commit flag 460, and issues the Check Other Path signal 462, as follows:

a. LU 6.2 architecture manager L6 452 issues an OPC evoke macro at evoke time. The OPC evoke macro traverses the CN 406 conversation control blocks (CCB) looking for a matching conversation. It stores the address of the CN CCB and reset the First Crossing after Commit flag 460. A null address says it is NOT OPC.

b. L6 452 sets the First Crossing after Commit flag 460 when it knows that the commit flow is completed. This way, the next package will also be guaranteed to flow over the communications path 480 so that some commit optimization can be completed. This is to ensure that Distributed Relational Database Architecture (DRDA) two phase commit (DRDA2) control processing is implemented properly.

c. CN 406 or L6 452 issues on the data bus 490 the Signal Check Other Path Macro to switch control at target 200 from the data bus 490 to the communications path 480 before the first commit flow. Control passes to TMN 530 at the target system 200. TMN 530 sets the bit in the TMCB 450 and returns to CN RCV 406. CN RCV 406 will issue an ICF GET. The flag on the target is eventually switched back to receive from the bus 490 by a command initiated by CN 406.

Fast T2 (F2) 472 fans out a packet of data to driver OPC LD 476. OPC line driver 476 interfaces with the OPC device driver 478 and coordinates movement of a packet from source 100 to target 200.

APPC (AC) Target 542, when the first data after a commit flow comes across to the target, will store the data packet in a buffer, and pass it to ICF interface module IC 534.

LU 6.2 architecture manager L6 544 resets the flag in the TMCB 450 to indicate that the bus 490 should be used on future receive operations on target 200. This is done as part of the optimization processing on the first data flow after a commit flow.

New agent TMN 530 waits on bus path 490 for a receive_request. The default conversation to wait on is the bus 490 conversation. (Conversation is equivalent to path). When TMN 530 receives the next chunk of work to be done, it checks the command value sent across in an OPC header. When the command value is 2 Phase Operation, 2 bits of information in the TM control block (TMCB) 450 must be interpreted by TMN 530. The first bit is used to show that target 200 needs to Check Other Path, and stay there until told otherwise. The second bit is used to show that target 200 should check the other path once but then switch back to the bus. This is equal to a "go do one receive on the communications path only" flag. When this command is received, TMN sets the corresponding check path flags in the TMCB 450 then returns to receive RCV.

Receive (RCV) 508, in agent 520, checks the two flags in the TMCB 450 when the OPC flag is ON, indicating that OPC 478,564 started this agent 520. When the first flag is ON, RCV 512 issues an ICF GET. If the first flag is OFF, then new agent TMN 530 is called to do the receive wait on the bus 490. Upon return from bus 490, the first flag is checked to see if it is now necessary to issue an ICF GET. If it is ON, RCV 512 issues an ICF GET. If not RCV 512 returns with the data.

EDDM 510 checks flag two 468 before it calls RCV 512. IF flag two 468 is ON, EDDM 510 resets flag one 466. This will cause subsequent receives to be done via bus 490 if the OPC flag 464 is on.

Referring again to FIGS. 4A and 4B, the operation of the system of the invention will be described. In this process, application 402 opens a file on a protected conversation and proceeds through to commit. The letter 'S' or 'T' is placed prior to each label in the list below. 'S' stands for Source (client) 100 and 'T' stands for Target (server) 200. This is the location of the code module being described.

Step 1.

S—Application 402—The application issues an OPEN command for a DDM file located on another system 200.

Step 2.

S—Open system file management module TS 404—Asks communication I/O ICF interface CN 406 to return the path identifier to use for the file.

Step 3.

S—CN *—The DDM file 414 shows that the conversation is to be a protected conversation. CN 406 issues the evoke for the communications conversation, or path, 480.

Step 4.

S—AC—APPC 454 calls L6 452 during the evoke.

Step 5.

S—L6 *—Issues the OPC Evoke Macro. This sets up information about whether or not the conversation will be used by OPC or not (null pointer if not) and it will reset a First Crossing after Commit flag 460.

Step 6.

T—The target agent 520 program is started.

Step 7.

S—CN *—Control is back in CN 406 and the communications conversation 480 has been successfully started. CN 406 now attaches the bus path 490 to the correct agent code on the target, as will be described hereafter. TMN 530 will now be waiting on a receive_request on the bus 490. CN 406 will have successfully started both conversations on bus 490 and communication 480 paths, and now returns to TS 404.

Step 8.

S—TS—TS 404 opens the remote file and returns to application 402.

Step 9.

S—Application—Application 402 does some I/O operation (get/put/update, etc.)

Step 10.

S—TS'—Control comes into the TS' 416 code which coordinates doing the I/O operation strictly over the fast path (FP) 492: TS' 416 to OPC device driver (DD) 478, thence to OPC device driver (DD) 564, and thence to new agent (TMN) 530. Control returns to application 402.

Step 11.

S—Application—Application 402 issues some SP command.

Step 12.

S—CN—Control ends up in CN 406 where the OPC flag 464 is ON but not the First Crossing after Commit flag 460. Therefore, the command is sent to the target via the bus path 490 route: CN 406 to device driver 478 to device driver 564 to new agent TMN 530 to receive 512 to EDDM 510. The command finishes and control is back in CN 406, which returns control to application 402.

Step 13.

S—Application—Application 402 decides that it is time to issue a COMMIT command.

Step 14.

S—TN—Control goes to TN 412 then L6 452.

Step 15.

S—L6 *—Before the first flow of a commit operation, L6 452 issues the Check Other Path Macro 462 to tell TMN 530 that it should wait on the communications conversation 480 because something will be coming.

Step 16.

T—TMN *—TMN 530 checks the command value and realizes that it is a Check Other Path Command 462. TMN 530 sets the 2 bits, first bit and second bit, supra, in TMCB 450 then returns to RCV 512.

Step 17.

T—RCV *—Since RCV 512 had just called TMN 530 (since it is returning from TMN now) it now is required to check to see if it should issue an ICF GET or not. As the first flag 466 will be ON and the second flag 468 will be OFF, RCV 512 issues an ICF GET.

Step 18.

S—L6 *—L6 452 just finished issuing the Check Other Path command 462. It now issues its standard commit flows, all going over the communications path 480. Eventually, L6 knows when it is done. It sets the First Crossing after Commit flag 460 ON to make the next data to the target job also flow on the communications conversation 480. Control returns to TN 412.

Step 19.

S—TN—TN 412 returns control to application 402.

Step 20.

S—Application—Application 402 issues another I/O command.

Step 21.

S—TS' *—TS' 416 needs to always check the First Crossing after Commit flag 460. When it is ON, I/O should not happen over the fast path 490. To get this I/O operation done, the equivalent TS module 404 is called.

Step 22.

S—TS—Control comes into TS 404 from TS' 416. TS calls CN 406.

Step 23.

S—CN *—CN 406 checks the First Crossing after Commit flag 460 and finds it ON. On the target system, control has been stalled in TN 518. It is waiting for optimization data to be sent to it from L6 452 at source 100. CN 406 routes the command packet down the communications path 480.

Step 24.

S—AC—AC 454 notifies L6 452 that the first data after the commit flow has come in.

Step 25.

S—L6—L6 452 sends its optimization data to target 200 along with the other data. The other data ends up waiting in some AC 542 target buffer while TN 518 gets the optimization data from L6 452 at source 100.

Step 26.

T—TN—TN 518 finishes its work.

Step 27.

T—TN *—TN 518 makes a LUW complete call to L6 544.

Step 28.

T—L6 *—L6 544 sets the first flag 466 in the TMCB 462 OFF so that the default conversation to wait on is once again reset to the bus 490.

Step 29.

T—L6—L6 544 returns to TN 518.

Step 30.

T—TN—TN 518 returns to RH 504.

Step 31.

T—RH—RH 504 returns to EDDM 510.

Step 32.

T—EDDM—EDDM 510 calls RCV 512 to wait for the next job to do.

Step 33.

T—RCV *—RCV 512 checks to see if the OPC flag 464 is ON. It is. It checks the first flag 462 to see if it is ON. It is not. RCV 512 calls TMN 530 to wait for the next request.

Step 34.

T—TMN—TMN 530 is now waiting on a receive-request on the bus 490.

Step 35.

S—CN *—CN 406 has finished sending the data across the communications path 480. It resets the First Crossing after Commit flag 460. CN 406 issues a Check Other Path Command 462 with both bit one and bit two turned ON. The data is still sitting in some AC buffer 542 on target 200. The Check Other Path 462 route to the target is over the bus 490.

Step 36.

T—TMN *—TMN 530 gets the packet, realizes that it is a Check Other Path command 462 and sets the flags 466 and 468 in the TMCB 450 accordingly. It then returns to RCV 512.

Step 37.

T—RCV *—RCV 512 checks flag one 466 in the TMCB 450 and sees that it is ON. RCV 512 issues an ICF GET. Next RCV 512 returns to EDDM 510.

Step 38.

T—EDDM—EDDM 510 calls the appropriate RH 502, 504.

Step 39.

T—RH—RH 502, 504 does its job and then returns to EDDM 510.

Step 40.

T—EDDM *—Before calling RCV 512, EDDM 510 checks flag two 468 in the TMCB 450. If it is ON (it is), it resets flag one 466 so that subsequent receives are done via the bus 490.

Step 41.

T—RCV *—RCV 512 checks flag one 466 then calls TMN 530 to wait for the next request.

Step 42.

T—TMN 530—It is back to business as usual. Control is sitting on a receive_request on the bus 490 in TMN 530.

Step 43.

S—CN 406 has finished issuing the Signal Check Other Path Macro 462. It returns to TS 404.

Step 44.

S—TS—TS 404 is done. It returns to TS' 416.

Step 45.

S—TS'—TS' 416 is done. It returns to application 402.

Step 46.

S—Application—Application 402 goes about its merry way.

The method of the invention for enabling 2 Phase Commitment Control will next be described in greater detail. OPC branches off, at the latest, in CN module 406, as has been explained in connection with FIG. 4A. Both a communications path 480 and an OPC bus path 490 are opened to a single agent 520 on the target 200 from the single source 100 job. Fast path I/O commands such as GETs and PUTs are routed over the OPC fast path 490/492. Commitment control commands are routed over a longer communications path 480.

Referring to FIGS. 4A and 4B, when executing the OPC fast path 492, control flows from TS' 406 directly to DD 478, across the optical bus 479 to DD 564 on the target system, and then directly to TMN 530 where all processing takes place. For slow path commands, control leaves from CN 406 on the source and arrives at TMN 530. TMN 530 falls back to RCV 512 and the resource handlers RH process these commands. The difference is that if it is detected that it is a slow path command, TMN 530 returns to RCV 512 and eventually some RH 502, 504 where the requested action is carried out.

Internal 2 Path Component Design

Referring further to FIGS. 4A and 4B, two paths are illustrated set up between a client and server job pair. This figure illustrates the manner in which two protocol paths or stacks 480 and 490 are twisted together, or entwined, so as to share the same agent 520. Straight DDM will have a single communications conversation 480. Straight OPC will have a single bus conversation 490. When OPC is requested, a communications conversation 480 and a bus conversation 490 will be set up when, in the DDM file 414, or when creating an SQL program, the customer has indicated that the conversation should be protected.

The initialization of the 2 paths, the communication path 480 and OPC bus path 490, is coordinated from INIT module 426 on the source. As noted previously, the communications path 480 is set up first, followed by OPC bus path 490. As such, it is ensured that all of the 2 phase commitment control initializations are properly done. The entire evoke, including EXCSAT (described in greater detail hereafter) is done for Communications. The second path (bus) 490 can be set up at the end of the mainline. To do so, a call to an internal routine to do the bus evoke is done, excluding EXCSAT. Device and module descriptions 430, 436 (described hereafter in connection with FIG. 5) are used. Internally, the CN 406 code looks up a controller to which the device is attached. A controller link type of "*OPC" is the flag 464 which signals OPC, otherwise the standard Communications route will be taken.

The EXCSAT structure contains "Call OPC Mgr" flag 464 which is sent to target 200 during the EXCSAT for the communications conversation 480. This flag is used by receive RCV 512 to determine whether it should do a standard ICF ?GET or call an internal routine which will wait on a keyed queue until the OPC manager enqueues a message from its client partner. The EXCSAT structure, contained in INIT module 426, contains a flag field 470 which, if the conversation is protected and the OPC bus is to be used, is set to 'Y', otherwise 'N'.

Control of the evoke of the Communications path 480 will wind up in the Attach Manager 532 after having followed an APPC path 542. Attach Manager 532 will submit a job for EDDM 510 (passing no parameters). EDDM 510 will eventually find its way into RCV 512 through normal processing channels. RCV 512 will wait on an ICF ?GET. The first one will be the EXCSAT from the source system 100. Control will pass back to EDDM 510 and EXCR 456 where the server attributes will be saved. Next, the server attributes for the remote system will be sent back to to the source system. Eventually control will return to RCV 512.

INIT 426, on the source, is in control of coordinating getting both paths 480 and 490 fired up. The Communications path 480 has just been initialized correctly. INIT 426 knows that both paths need to be started so it now issues the OPC send evoke command. Control is in CN SEND 406. An open stream followed by an open path extended will be issued. The extended data will contain the fully qualified target job id of agent 520. This is used as a key on a keyed work queue (not shown) on the target system 200. The open path will use a new resource id for use by OPC MGR 524.

Control passes through the device driver 478 on the source system to the device driver 564 on the target system. The OPC Manager 524 is called for an open path extended. The OPC manager will enqueue by key (fully qualified target job id), onto the keyed work queue the function, path id, and resource id.

EDDM 510 initializes all of the required bus 490 fields. It then calls RCV 512. RCV calls TMN 530 to wait on a receive request. TMN waits on a receive_request waiting for its next piece of work to be done.

External User Interface

Figure 5:
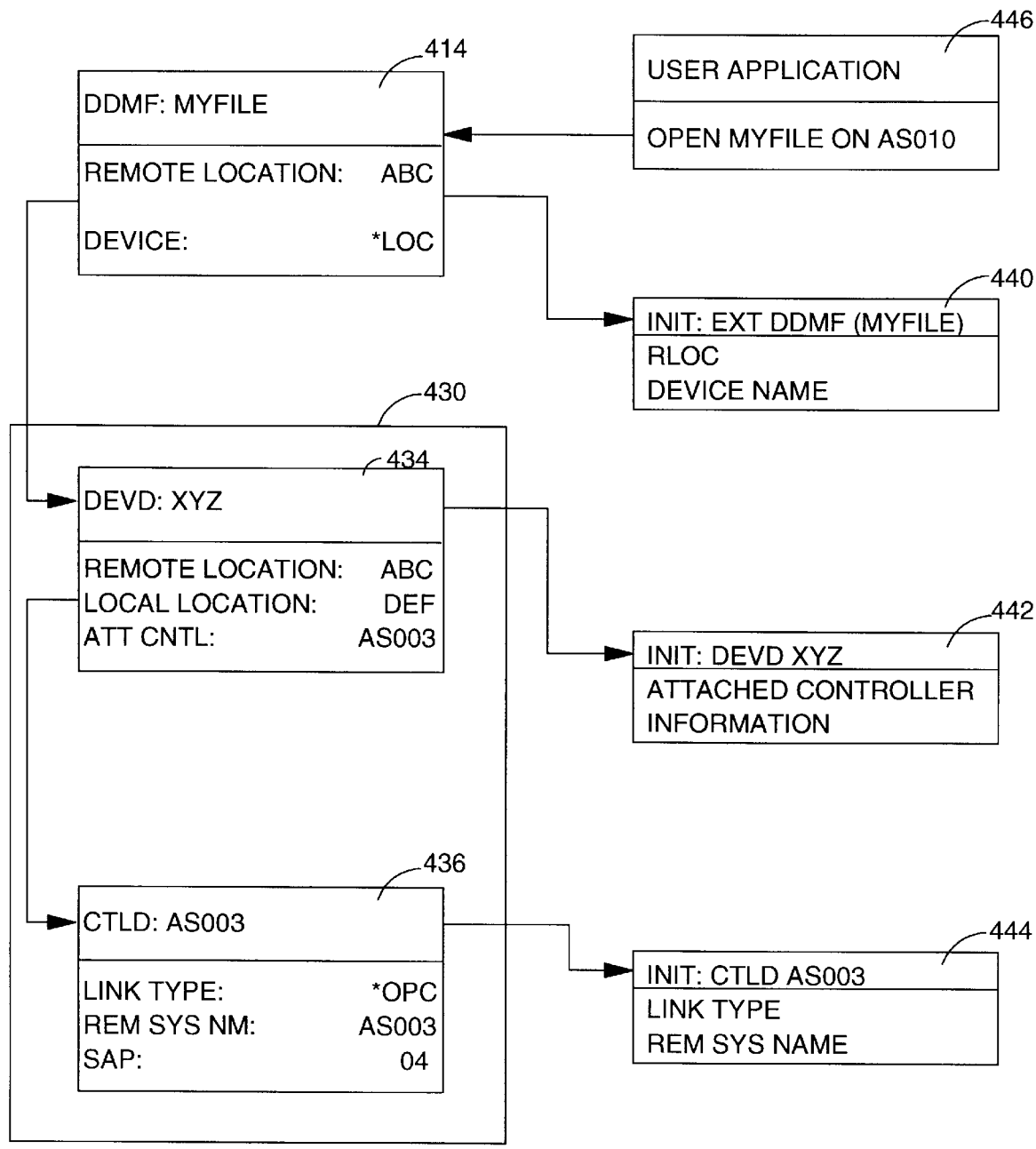
FIG. 5 is a diagramatic illustration of the process for accessing OptiConnect/400 devices and controllers on a source system.

Referring to FIGS. 5 and 6A–6B, the rules for setting up OPC line driver 476, 566 descriptions, device descriptions, and DDM files 414 will be described. FIG. 5 illustrates how a user supplies a remote location name in DDM files 414, and how that is transformed into a remote system name which is used by the OPC DD to communicate with the correct remote system—and thus describes the OPC control path 480. FIGS. 6A and 6B show two ways for a user to set up in a DDM file 414 the remote location name and the device description/controller descriptor pairs 430.

Before an OPC line driver 476 or device can be successfully varied on, the QSOC subsystem must be started. This description sets forth the differences required to implement this preferred embodiment of the invention as an improvement upon the prior release of the AS/400 OptiConnect.

Controller Descriptions for OptiConnect

Referring to Tables 1 and 2, illustrating the CRTCTLAPPC panel, as with other communications controller descriptions, the OPC line driver 476 description is used to describe access to an adjacent system. Following is a list of the fields used in an OPC controller description and the rules for each. In parentheses, following the field name, is located the keyword name as listed on the CRTCTLAPPC panel, and examples of most are illustrated in FIGS. 5 and 6A–6B.

Controller description (CTLD)

The user follows standard rules. There are no special OPC restrictions.

Link type (LINKTYPE)

When the link type field contains *OPC, then this is a description of an OPC line driver.

Online at IPL (ONLINE)

Since this parameter is one listed on the initial CRTCTLAPPC panel, there is no way of simply suppressing its display. OPC (that is, a preferred embodiment of the invention in OptiConnect/400) will only support this as (*NO) and the default is (*YES). When a link type of *OPC is chosen, the DC component (see FIGS. 8 and 9) changes this parameter to (*NO) upon the creation of the controller.

APPN-capable (APPN)

The default and only acceptable parameter for APPN-capable is *NO when the link type is *OPC. OPC is a low-entry networking node (*LENNODE) product with strictly point to point fiber optical bus connections and no IOPs. Since this parameter has only one choice, the parameter is not displayed.

Remote system name (RMTSYSNAME)

The remote system name supplied should be a current system name of an adjacent system 200 to which there is an OPC bus connection 479.

LAN DSAP (DSAP)

OPC uses the LAN DSAP field as it is. The combination of the Remote System Name and the DSAP field must be unique to allow the AC 454 controller to be varied on. This will allow multiple modules 454 to a remote system to be used.

Given the descriptions above, the creation of a *OPC APPC Controller in APPC itself will appear to the user as illustrated in Tables 1 and 2.

TABLE 1

Create Ctl Desc

Type choices, press Enter.
| | | |
|---|---|---|
| Controller description | APPCOVEROC | Name |
| Link type | *OPC | *OPC, *ANYNW |
| Online at IPL | *YES | *YES, *NO |

TABLE 2

Create Ctl Desc

Type choices, press Enter.
| | | |
|---|---|---|
| Controller description. | APPCOVEROC | Name |
| Link type | *OPC | *OPC, *ANYNW |
| Online at IPL | *NO | *YES, *NO |
| Remote system name | ENDAS001 | Name |
| LAN DSAP | 04 | |

DDM File Interface

Referring to FIGS. 5 and 6A–6B in connection with FIG. 4A, on source system 100, for each remote OPC system 200 to be used, there is a controller/device description pair CTLD/DEVD 430 defined. The Link Type in Controller description 436 is *OPC and the remote system name is the system name of the remote, adjacent system 200. The remote system name is used in the Open_Path internal OPC device driver 478 command. The remote location in the DDMF 414 is used to locate the Device Description 434 on the source system 100 to use.

As illustrated in FIG. 5, in step 446, user application 402 opens MYFILE on source system 100 (AS010). In step 440, INIT module 426 is accessed to bring in the remote location RLOC name (ABC) and device name (*LOC). In step 442, INIT module 426 is accessed to get the device description for XYZ, and this brings in the attached controller information for target system 200 (AS003). Next, in step 444, CLD AS003 is obtained, and this brings in the link type and remote system name. The remote system name is used on the Open_Path to device driver 478. The link type is checked to see if the user wants to use OptiConnect (*OPC) or DDM. When the link type is *OPC the OPCorDDM flag in CN 406 will be set to OPC, otherwise DDM.

Referring to FIGS. 6A and 6B, there are 2 ways of identifying which device/controller descriptor pair 430 to use.

1. For the remote location name in DDMF 414, supply the same name used in the DEVD 434 that the user chooses. If QQQ was supplied in the DEVD 434 for the remote location, then supply QQQ as the remote location in the DDMF 414. Use *LOC for the device field in DDMF 414 in this case.

2. Put *DEVD in the remote location field in the DDMF 414. Supply the real DEVD name in the device field in the DDMF 414. This method is only supported using CHGDDMF.

Vary On OPC line driver Scenarios

Figure 7:
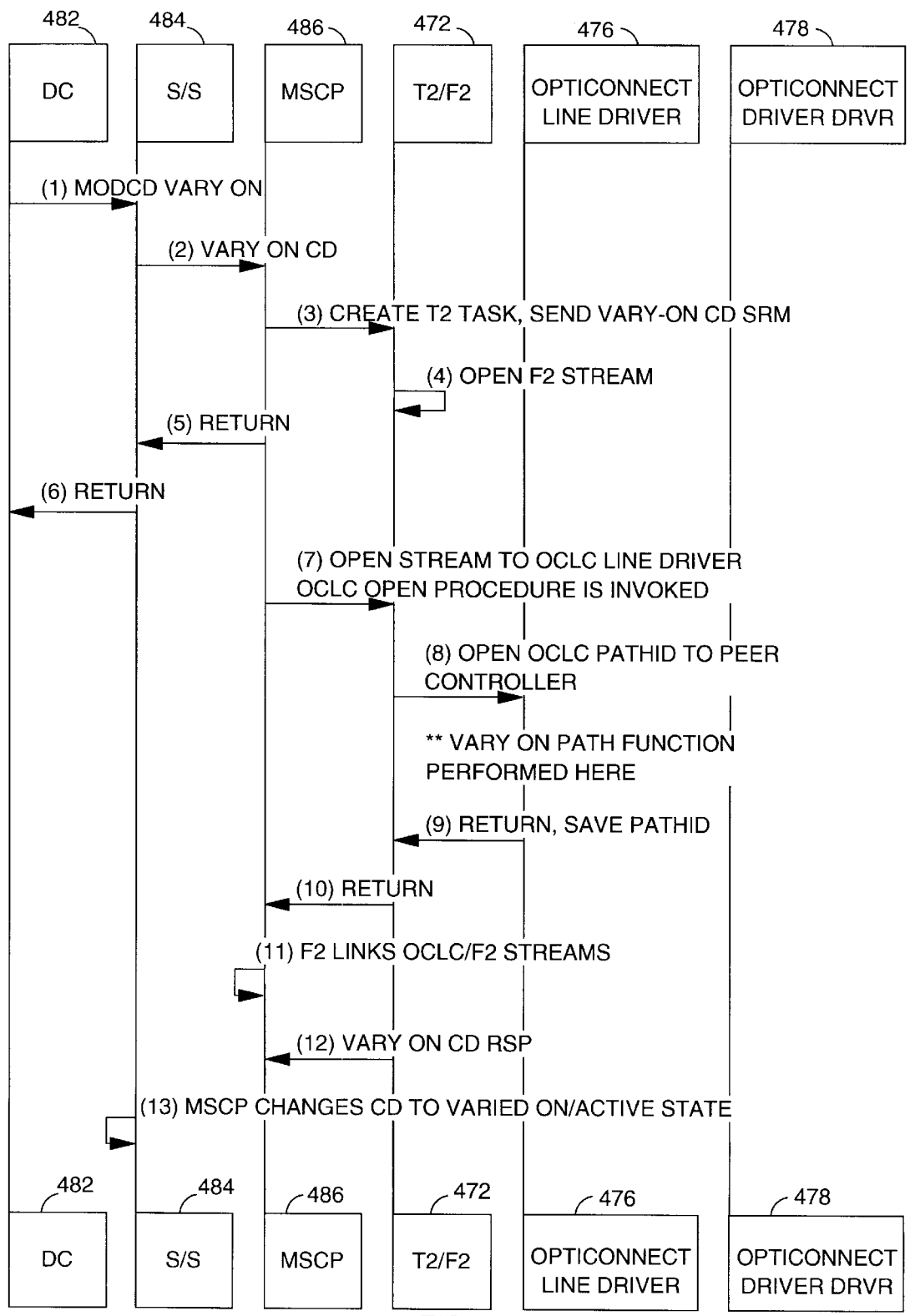
FIG. 7 is a timing diagram of vary-on OPC line driver controller scenarios.
Figure 8:
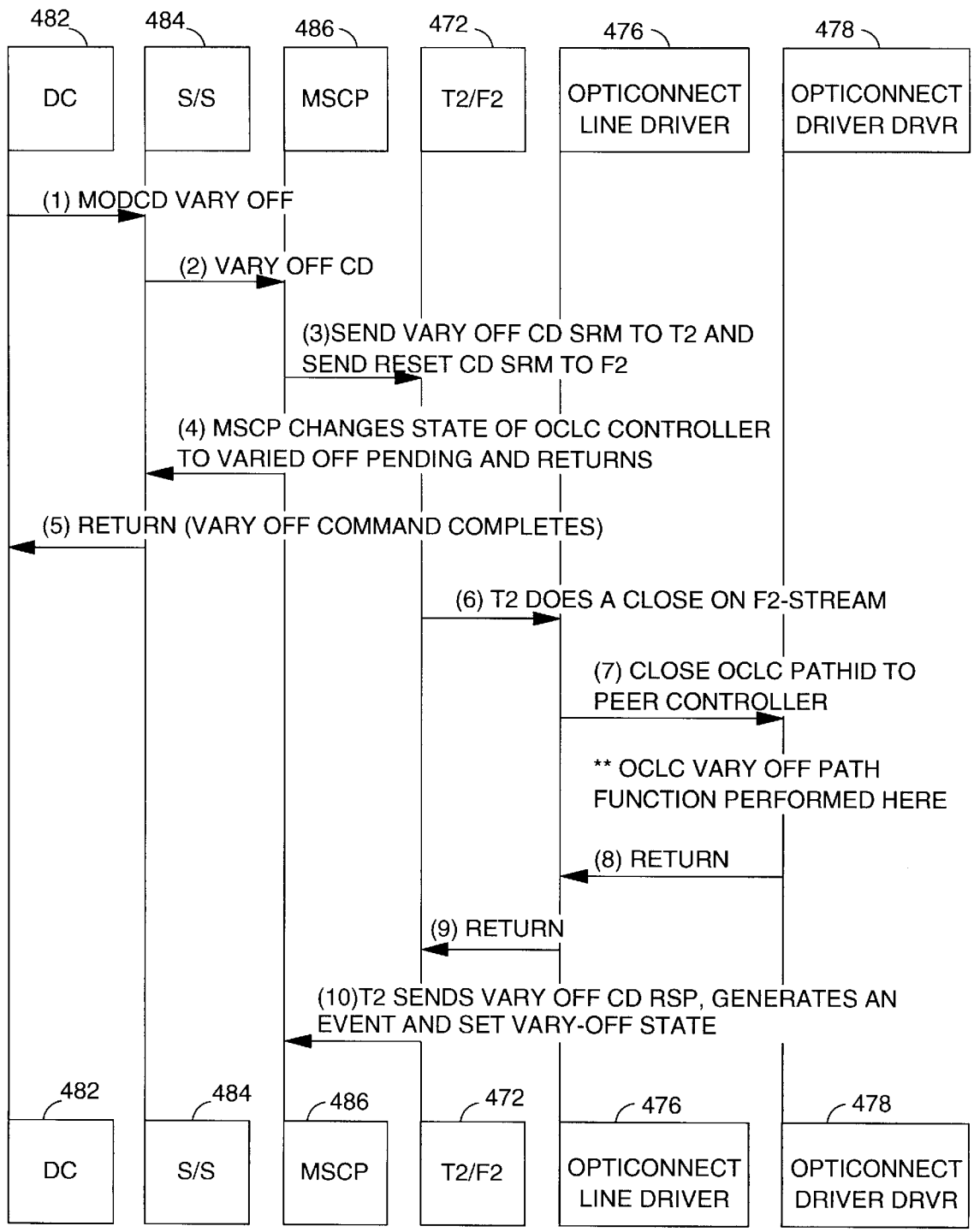
FIG. 8 is a timing diagram of vary-off OPC line driver scenarios.

FIGS. 7 and 8 illustrate the handshake and resulting logical paths for vary on, which results in the meeting point where bus 479 can be used for both control 480 and data 490, which is a tying of two protocol stacks together coordinated across bus and line drivers. It shows the scenarios involved in varying on an APPC module 454 for OPC line driver 476, and in FIG. 8 the vary off scenario is shown.

For vary on (FIG. 7):

1. Device configuration DC 482 issues a MODCD(Vary On) for an APPC module 454.
2. Source/Sink 484 is invoked to process MODCD MI and invoke sychronous MSCP to perform vary on processing.
3. Synchronous MSCP 486 initializes control blocks, and sends a Vary On CD SRM to asynchronous MSCP. The T2 task is created and sends Vary On CD SRM to T2/F2 472 and then waits for response.
4. F2 472 opens 'F2' STREAM to F2.

5. Synchronous MSCP 486 returns vary on CD to Source/Sink 484.
6. Source/Sink 484 returns to DC 482 to complete Vary On command.
7. F2 472 opens F2 STREAM to OPC line driver 476 which causes the OPC line driver 476 Open procedure to run.
8. The OPC line driver 476 OPEN-PATH routine is called to open path to the remote system 200.
9. The OPC line driver 476 Open-Path is returned from OPC device driver 478. The connection to remote system 200 is established.
10. OPC line driver 476 Open procedure ends and returns to F2 472. If the two paths for the connection are opened successfully, OPC line driver 476 incoming task and response task for the controller are created.
11. F2 472 links the two parts of the F2 STREAMs.
12. T2 472 Sends Vary-On CD response to asynchronous MSCP 486.
13. Asynchronous MSCP 486 changes the state of OPC line driver 476 to varied on/active.

For Vary Off (FIG. 8):
1. The APPC module 454 (*OPC LINKTYPE) is varied off and DC 482 sends MODCD to S/S 484.
2. Source/Sink 484 sends Vary Off CD to MSCP 486.
3. MSCP 486 sends Vary Off CD SRM to T2 and Reset CD to F2 472.
4. MSCP 486 changes the status of OPC line driver module 476 to Varied Off Pending and returns Vary Off CD to S/S 484.
5. S/S 484 returns to DC 482 to conclude the Vary Off command.
6. T2 472 issues a Close to the F2-Stream.
7. The OPC line driver 476 Close procedure closes OPC pathid and does cleanup.
8. The Close procedure completes closing pathid, cleanup and returns to line driver 476.
9. The OPC line driver line driver 476 returns to T2 472.
10. T2 472 sends Vary-Off CD response to MSCP 486, generates an event and set vary-off state.

System Structure

FIGS. 4A, 4B, and 9–11, with all controllers and devices varied on as described above, the QSOC subsystem up and running, and all evokes for the application shown completed, a description will be given of general path flows during normal and some abnormal processing.

Check Other Path

After both a communications 480 and a fiber optical bus conversation 490 have been established to a single target agent 420 from a single source job 402, the source job will be at some point of execution and the target job 520 will be waiting in a RECEIVE_REQUEST function. The RECEIVE_REQUEST is a function implemented by the OPC DD 564. It waits on a stream until a request comes to it. When the request data (a SEND_REQUEST from the source) arrives, it is placed in memory and the job waiting on the RECEIVE_REQUEST is awoken.

Since two conversations have been established, it is the intention of OPC to use both paths 480, 490. The communications conversation 480 needs to be waiting with an ICF ?GET to receive data on the target. To do so, and allow data to flow on both conversations, the Check Other Path 462 command is executed.

When in CN SEND 406, sometimes the data flows from CN SEND 406 through the OPC DD 478 to the target system 200. Sometimes the data should flow through IC 432 and beyond to the target 200. Three flags play a role in making the decision on which path to go.
1. DDM/OPC flag (0/1) 464.
2. 1PCC/2PCC flag (0/1) 466,468.
3. First Crossing after Commit flag (0/1) 460.

If the DDM/OPC 464 flag is 0, then, this is a standard DDM communications conversation flow and nothing special should happen. Path 1 480 should always be chosen. If the OPC flag 464 is ON, then if the 2PCC flag 468 is ON, then if the First Crossing after Commit flag 460 is ON, control should pass through Path 1 480, otherwise Path 2 490. Thus:
1. All DDM 414 data streams arriving in CN SEND 406, for which the OPC has not been enabled, will travel over the standard communications path 480.
2. All OPC enabled, 2 phase commitment control, commands will be redirected over the standard communications path 480 if the First Crossing after Commit flag 460 is ON.
3. All other OPC enabled commands will flow over the bus conversation 490. (Benefit from the speed when asked to and it's not a 2 phase commit-style command).

Advantages over the Prior Art

The method and system of this invention significantly enhances the communication performance for distributed transactions by bypassing a very significant portion of network communication overhead on both source and target systems. This becomes a necessity as the bandwidth of data link improves. Additionally, all APPC architectural requirements are preserved and ICF/CPI-C interfaces remain intact.

Alternative Embodiments

It will be appreciated that, although specific embodiments of the invention have been described herein for purposes of illustration, various modifications may be made without departing from the spirit and scope of the invention.

Accordingly, the scope of protection of this invention is limited only by the following claims and their equivalents.

We claim:

1. In a client/server communications system in which each system includes a strictly layered protocol stack comprising a plurality of layers for establishing communications and transferring data with respect to the other for a given process, a protected conversation method comprising the steps of:

establishing dual control and data paths from the client system to a single agent on the server system, the control path including said protocol stack and a data path including a subset of the layers of said protocol stack, said subset bypassing at least one layer of said protocol stack;

transferring packets of control information for a given process on said control path;

transferring packets of data information on said data path; and synchronizing communications so that said client and server systems send and receive communications packets on the same one of the two paths.

2. A method for communicating data and control between a plurality of systems, each system including a communication protocol stack having at least three architected protocol layers, including an application layer above a machine interface and an interface layer to a physical layer below said machine interface, responsive to a request from an application program in a client system to establish a protected conversation with a server system, determining if a communication path already exists between said client and server systems for said conversation; and if not establishing a dual communication path and bus path to a single agent on said server system, said communication path traversing said communication protocol stack and said bus path traversing a subset excluding at least one of the layers of said protocol stack;

transferring packets of control information for this conversation on said communication path;

transferring packets of data information for this conversation on said bus path; and synchronizing the communications on said paths so that said systems send and receive communications packets on the same one of the two paths.

3. A method for executing a protected conversation between a client system and a server system, each system including an architected protocol stack for managing communications between said systems, comprising the steps of establishing a communications path traversing all layers of said protocol stack from said client system to an agent on said server system;

attaching a bus path to said communications path to said agent, said bus path traversing a subset of the layers of said protocol stack, said subset bypassing at least one layer of said protocol stack;

putting said agent to sleep on said bus path;

receiving at said server system on said bus path a data message including a data command, or a check other path command;

responsive to said data command, operating said server system to execute said data command;

responsive to said check other path command, putting said agent to sleep on said communication path;

responsive to a control command on said communication path, operating said server system to execute said control command and wait on receipt of a first crossing flag on said communication path; and responsive to said first crossing flag, operating said server system to return control to said bus path.

4. The method of claim 3 wherein said communications path traverses a plurality of architected protocol layers in each of said client and said target systems, and wherein said data path traverses at least one less architected protocol layer.

5. The method of claim 4 wherein said communications path and said data path both traverse the same physical link between said client and server systems.

6. The method of claim 5 wherein said physical link is a serial optical channel.

7. A memory device for storing electrical signals operable to control a digital computer to execute a protected conversation between a client system and a target system, each system including an architected protocol stack for managing communications between said systems, said protected conversation comprising the steps of establishing a communications path traversing all layers of said protocol stack from said client system to an agent on said server system;

attaching a bus path to said communications path to said agent, said bus path traversing a subset of the layers of said protocol stack, said subset bypassing at least one layer of said protocol stack;

putting said agent to sleep on said bus path;

receiving at said target system on said bus path a data message including a data command, or a check other path command;

responsive to said data command, operating said target system to execute said data command;

responsive to said check other path command, putting said agent to sleep on said communication path;

responsive to a control command on said communication path, operating said target system to execute said control command and wait on receipt of a first crossing flag on said communication path; and responsive to said first crossing flag, operating said target system to return control to said bus path.

8. Apparatus for executing a protected conversation between a client system and a target system, each system including an architected protocol stack for managing communications between said systems, comprising:

means for establishing a communications path traversing all layers of said protocol stack from said client system to an agent on said server system;

means for attaching a bus path to said communications path to said agent, said bus path traversing a subset of the layers of said protocol stack, said subset bypassing at least one layer of said protocol stack;

means for putting said agent to sleep on said bus path;

means at said target system for receiving on said bus path a data message including a data command, or a check other path command;

means responsive to said data command, for operating said target system to execute said data command;

means responsive to said check other path command, for putting said agent to sleep on said communication path;

means responsive to a control command on said communication path, for operating said target system to execute said control command and wait on receipt of a first crossing flag on said communication path; and means responsive to said first crossing flag, for operating said target system to return control to said bus path.

9. A client system for executing a protected conversation between said client system and a target system, said client system including a protocol stack having a plurality of layers including an application layer, a physical layer, and at least one intermediate layer for managing communications between said systems, comprising:

a communications path traversing said protocol stack from said application layer to said physical layer;

a bus path attached to said communications path, said bus path bypassing at least one intermediate layer; and a device driver for transferring data packets with respect to said bus path and control packets with respect to said communications path selectively to and from said physical layer for communication with said target system.

10. The client system of claim 9, further comprising:

an initialization module responsive to a request for a protected conversation with said target system for coordinating the initialization of said communications path and said bus path.

11. The client system of claim 10, further comprising:

a first crossing after commit flag set on to assure transmission over the communications path of a first packet of data following a commit flow;

a check other path flag for controlling synchronization of said target system to the same path as said client system.

12. A target system for executing a protected conversation between said target system and a client system, said target system including a protocol stack having a plurality of layers including an application layer, a physical layer, and at least one intermediate layer for managing communications between said systems, comprising:

a communications path traversing said protocol stack from said application layer to said physical layer;

a bus path attached to said communications path, said bus path bypassing at least one intermediate layer; and a device driver for transferring data packets with respect to said bus path and control packets with respect to said communications path selectively to and from said physical layer for communication with said client system.

13. The target system of claim 12, further comprising:

an agent responsive to a check other path flag and a first crossing after commit flag received from said client system for synchronizing communications with said client system to one of said communications path or said bus path.

14. The target system of claim 13, further comprising:

means for putting said agent to sleep on said bus path;

means at said target system for receiving on said bus path a data message including a data command, or a check other path command;

means responsive to said data command, for operating said target system to execute said data command;

means responsive to said check other path command, for putting said agent to sleep on said communication path;

means responsive to a control command on said communication path, for operating said target system to execute said control command and wait on receipt of a first crossing flag on said communication path; and means responsive to said first crossing flag, for operating said target system to return control to said bus path.

* * * * *